US006006724A

United States Patent [19]

Takahashi et al.

[11] Patent Number: 6,006,724

[45] Date of Patent: Dec. 28, 1999

[54] ENGINE THROTTLE CONTROL APPARATUS

[75] Inventors: Nobutaka Takahashi, Yokohama; Yoshitaka Deguchi, Kanagawa, both of Japan

[73] Assignee: Nissan Motor Co., Ltd., Yokohama, Japan

[21] Appl. No.: 09/102,366

[22] Filed: Jun. 23, 1998

[30] Foreign Application Priority Data

Jun. 24, 1997 [JP] Japan .................................... 9-167613

[51] Int. Cl.[6] ...................................................... F02D 41/12

[52] U.S. Cl. .................... 123/339.19; 123/480; 123/399; 701/110

[58] Field of Search ......................... 123/339.19, 339.25, 123/352, 361, 399, 339.16, 478, 480, 295, 305; 701/70, 93, 110

[56] References Cited

U.S. PATENT DOCUMENTS

| | | | |
|---|---|---|---|
| 4,947,816 | 8/1990 | Nakaniwa et al. | 123/406.46 |
| 4,951,209 | 8/1990 | Nagaishi et al. | 364/431.04 |
| 5,101,786 | 4/1992 | Kamio et al. | 123/399 |
| 5,492,095 | 2/1996 | Hara et al. | 123/339.19 |
| 5,625,558 | 4/1997 | Togai et al. | 701/93 |
| 5,718,200 | 2/1998 | Chujo et al. | 123/339.16 |
| 5,722,362 | 3/1998 | Takano et al. | 123/295 |
| 5,875,762 | 3/1999 | Tsuchiya | 123/399 |

FOREIGN PATENT DOCUMENTS

| | | |
|---|---|---|
| 1-121536 | 5/1989 | Japan . |
| 1-294933 | 11/1989 | Japan . |
| 6-146933 | 5/1994 | Japan . |
| 8-193536 | 7/1996 | Japan . |
| 9-287513 | 11/1997 | Japan . |

OTHER PUBLICATIONS

Nissan Direct–Injection Engine, NEODi–Gasoline Engine Diesel Engine.

*Primary Examiner*—Terry M. Argenbright
*Assistant Examiner*—Arnold Castro
*Attorney, Agent, or Firm*—Foley & Lardner

[57] ABSTRACT

The invention ensures that a vehicle responds in accordance with a driver's expectations during negative pressure control (or boost control). A negative pressure control target intake air flow rate is calculated. This air flow rate ensures that the pressure in a cylinder does not drop too low (which could increase oil leakage into the cylinder). A greater one of an ISC (idle speed control) target torque and a negative pressure control target intake air flow rate torque-converted value is selected. The selected torque is set as an engine demand torque. The engine demand torque is combined with a driver demand torque to calculate a target torque. The throttle valve is controlled in an electronic manner based on the target torque.

10 Claims, 13 Drawing Sheets

VEHICLE SPEED SENSOR
28
20
CONTROL UNIT
22
2
4
6
7
27
3
23
25
5
1
26
8
21
24

100
TARGET TORQUE CALCULATION
111
BASIC FUEL DELIVERY REQUIREMENT CALCULATION
112
EFFICIENCY CORRECTION
113
TARGET AIR-FUEL RATIO CALCULATION
TARGET INTAKE AIR FLOW RATE CALCULATION
114
115
TARGET THROTTLE POSITION CALCULATION
116
DRIVE CONTROL
4
ELECTRONIC CONTROLLED THROTTLE VALVE
23
AFM
117
CYLINDER INTAKE AIR FLOW RATE CALCULATION
118
119
FUEL SUPPLY CALCULATION
120
DRIVE CONTROL
5
F/I

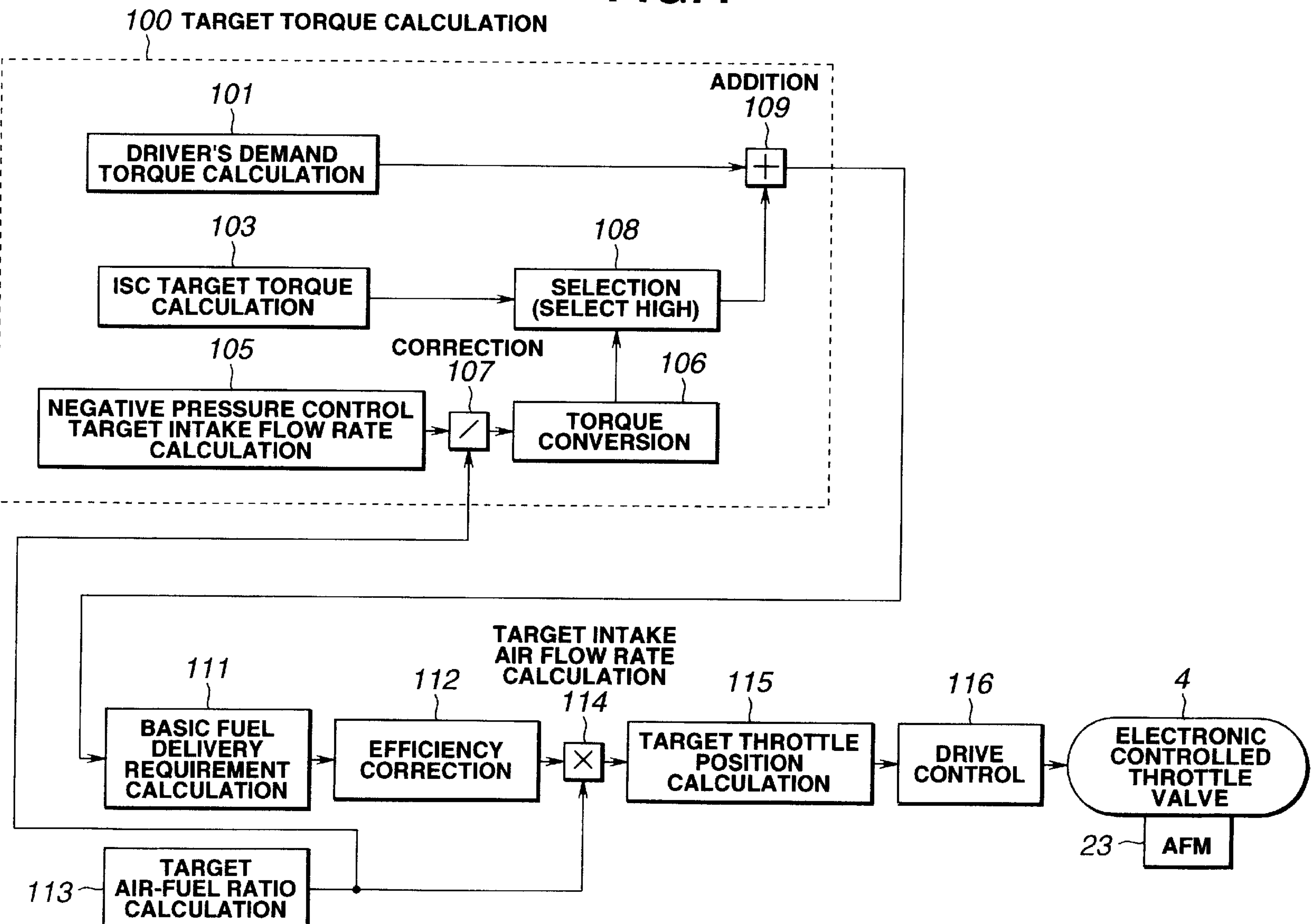
FIG.4
100 TARGET TORQUE CALCULATION
101
DRIVER'S DEMAND TORQUE CALCULATION
ADDITION
109
103
ISC TARGET TORQUE CALCULATION
108
SELECTION (SELECT HIGH)
105
NEGATIVE PRESSURE CONTROL TARGET INTAKE FLOW RATE CALCULATION
CORRECTION
107
106
TORQUE CONVERSION
TARGET INTAKE AIR FLOW RATE CALCULATION
114
111
BASIC FUEL DELIVERY REQUIREMENT CALCULATION
112
EFFICIENCY CORRECTION
115
TARGET THROTTLE POSITION CALCULATION
116
DRIVE CONTROL
4
ELECTRONIC CONTROLLED THROTTLE VALVE
23
AFM
113
TARGET AIR-FUEL RATIO CALCULATION

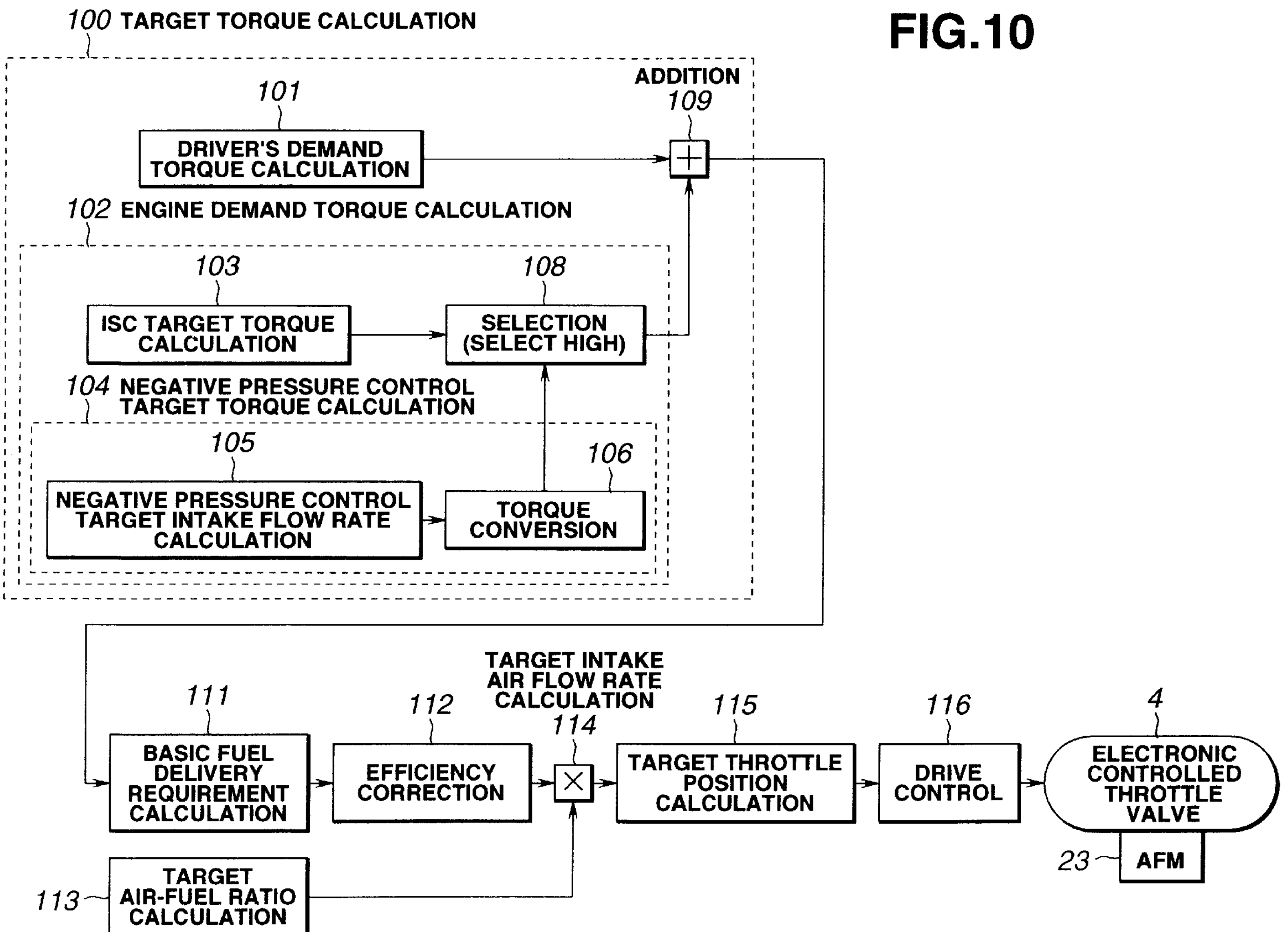
FIG.10
100 TARGET TORQUE CALCULATION
101
DRIVER'S DEMAND TORQUE CALCULATION
ADDITION
109
102 ENGINE DEMAND TORQUE CALCULATION
103
ISC TARGET TORQUE CALCULATION
108
SELECTION (SELECT HIGH)
104 NEGATIVE PRESSURE CONTROL TARGET TORQUE CALCULATION
105
NEGATIVE PRESSURE CONTROL TARGET INTAKE FLOW RATE CALCULATION
106
TORQUE CONVERSION
111
BASIC FUEL DELIVERY REQUIREMENT CALCULATION
112
EFFICIENCY CORRECTION
TARGET INTAKE AIR FLOW RATE CALCULATION
114
115
TARGET THROTTLE POSITION CALCULATION
116
DRIVE CONTROL
4
ELECTRONIC CONTROLLED THROTTLE VALVE
23
AFM
113
TARGET AIR-FUEL RATIO CALCULATION

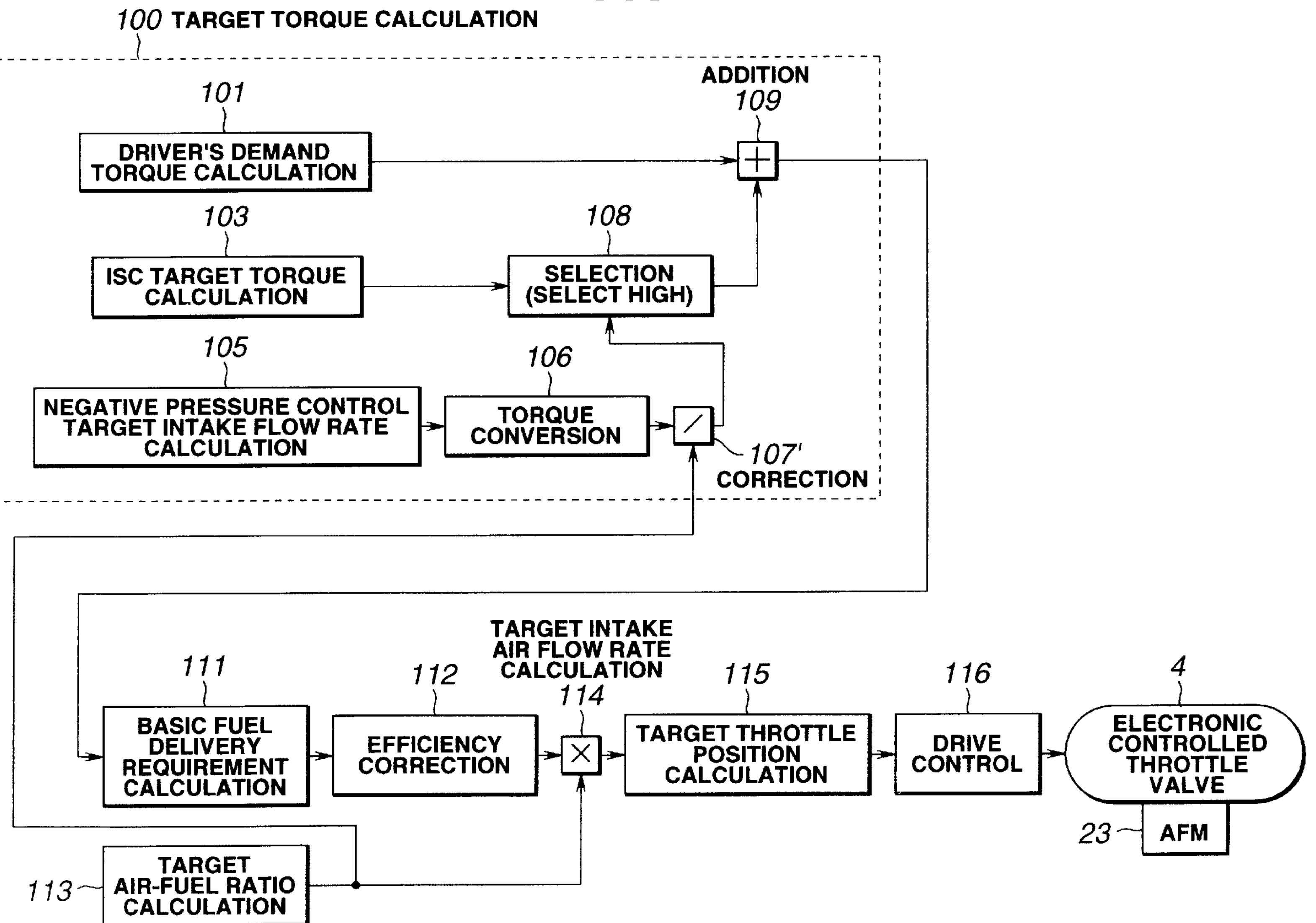
FIG.11
100 TARGET TORQUE CALCULATION
101 DRIVER'S DEMAND TORQUE CALCULATION
103 ISC TARGET TORQUE CALCULATION
105 NEGATIVE PRESSURE CONTROL TARGET INTAKE FLOW RATE CALCULATION
106 TORQUE CONVERSION
107' CORRECTION
108 SELECTION (SELECT HIGH)
109 ADDITION
111 BASIC FUEL DELIVERY REQUIREMENT CALCULATION
112 EFFICIENCY CORRECTION
113 TARGET AIR-FUEL RATIO CALCULATION
114 TARGET INTAKE AIR FLOW RATE CALCULATION
115 TARGET THROTTLE POSITION CALCULATION
116 DRIVE CONTROL
4 ELECTRONIC CONTROLLED THROTTLE VALVE
23 AFM

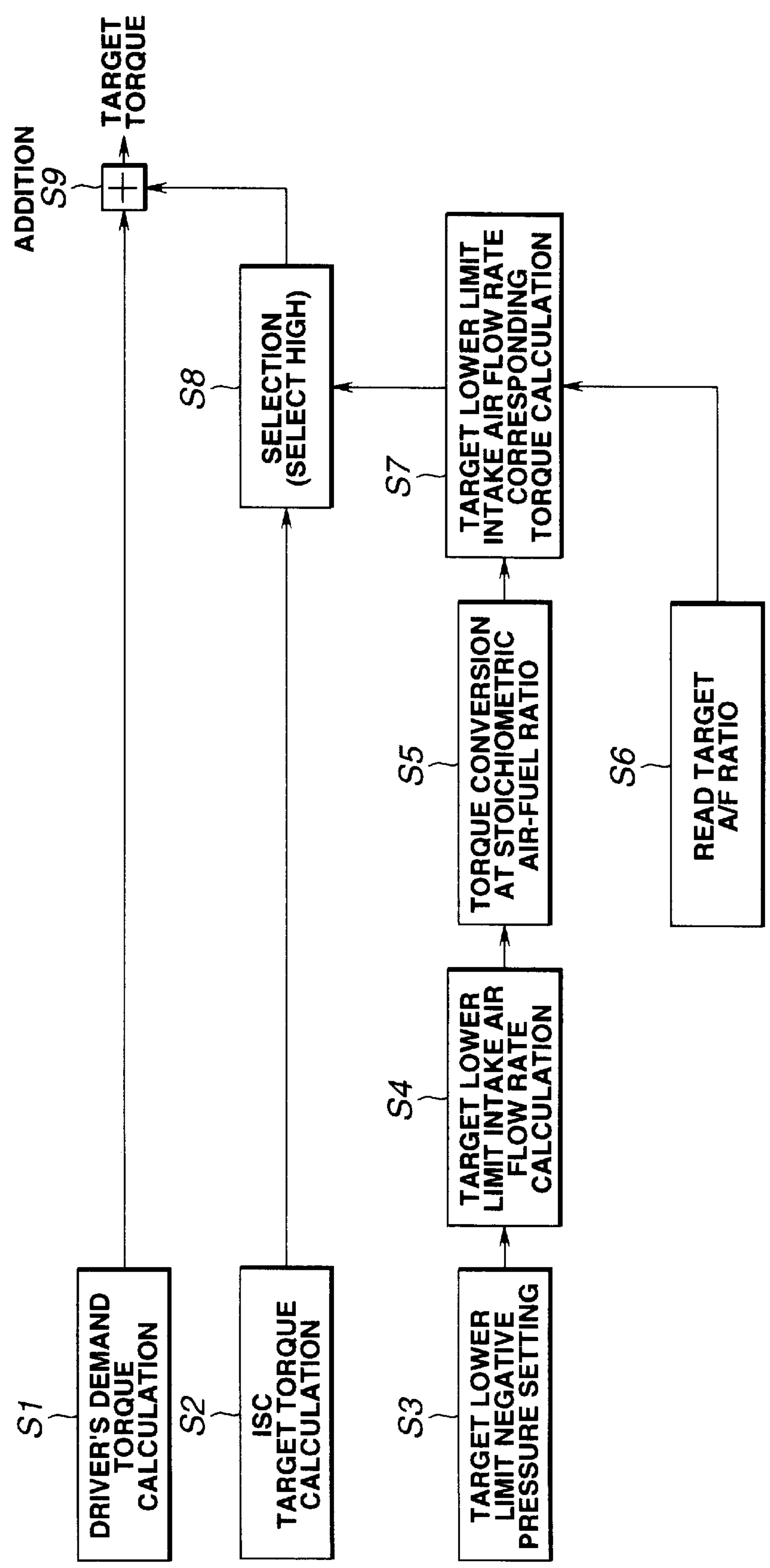
FIG.12
S1
DRIVER'S DEMAND TORQUE CALCULATION
S2
ISC TARGET TORQUE CALCULATION
S3
TARGET LOWER LIMIT NEGATIVE PRESSURE SETTING
S4
TARGET LOWER LIMIT INTAKE AIR FLOW RATE CALCULATION
S5
TORQUE CONVERSION AT STOICHIOMETRIC AIR-FUEL RATIO
S6
READ TARGET A/F RATIO
S7
TARGET LOWER LIMIT INTAKE AIR FLOW RATE CORRESPONDING TORQUE CALCULATION
S8
SELECTION (SELECT HIGH)
S9
ADDITION
TARGET TORQUE

ENGINE THROTTLE CONTROL APPARATUS

BACKGROUND OF THE INVENTION

This invention is directed to an engine throttle control apparatus for a vehicle.

It is conventional practice to control the idling speed of a vehicle to an optimum value by adjusting the degree of opening of an auxiliary air control valve provided in an auxiliary air passage that bypasses the main throttle valve under idling conditions.

Some vehicles have a boost control valve function (that is, a negative pressure control function during deceleration) in addition to such an idling speed control function. The boost control valve function entails introducing air into the intake manifold to prevent excessive intake manifold vacuum during deceleration when the throttle valve is being closed. This is effective to limit the vacuum (or negative pressure) in the cylinder so as to reduce oil leakage into the cylinder and minimize other problems.

For such a boost control valve function, the degree of opening of the auxiliary air control valve is set as follows. A controlled variable BCV is stored in a table according to the engine speed. Control is made with reference to this table during deceleration. A comparison is made between a controlled variable ISC (used for idling speed control) and the controlled variable BCV (for negative pressure control). A greater one of these controlled variables is selected to control the air intake. Further details regarding such control techniques are set forth in U.S. Pat. No. 4,951,209 and Japanese Patent Kokai Nos. 1-121536 and 1-294933.

In recent years, torque demand control has been suggested to control a throttle valve in an electronic manner (U.S. application Ser. No. 08/804,454, filed Feb. 21, 1997, now U.S. Pat. No. 5,931,138, which disclosure is incorporated by reference into this application). Such torque demand control entails calculating a target engine torque based on accelerator position and other parameters (for example, accelerator position and engine speed), and calculating a basic fuel delivery requirement value in a manner so as to realize the target engine torque. A target intake air flow rate is calculated based on the basic fuel delivery requirement value and a target air-fuel ratio. A target throttle valve position is calculated based on the target intake air flow rate, and the throttle valve is controlled to the target throttle valve position.

It is possible to realize negative pressure control during deceleration with the use of an engine throttle control apparatus employing an electronic controlled throttle valve, by applying a lower limit to the target intake air flow rate calculated during torque demand control such that negative pressure control during deceleration sets a lower limit on the amount of intake air.

That is, negative pressure control can be realized by calculating a negative pressure control target intake air flow rate for negative pressure control during deceleration, after the target intake air flow rate is calculated for torque demand control, and by selecting a greater one of the negative pressure control target intake air flow rate and the target intake air flow rate based on torque demand, and calculating the target throttle position based on the selected rate.

However, under a condition where the target intake air flow rate corresponding to the torque demanded by the driver increases from a very small initial value, if a control unit is designed not to increase the torque in accordance with the driver demand until the lower limit (negative pressure control target intake air flow rate) is reached, the following problem can occur. At the time t1 in FIG. 1, the engine torque does not increase (and the driver feels no acceleration) in spite of the driver demand for increased torque. At the time t2, the feeling of deceleration is rapidly eliminated in spite of no change in the driver demand.

In other words, at times tl and t2, the vehicle does not act in accordance with the driver's demand and expectations. The time between t1 and t2 can be up to several seconds. Thus, such a control technique results in non-optimum driving performance.

SUMMARY OF THE INVENTION

In view of the above considerations, an object of the invention is to improve driving performance by combining driver and engine demands in such a manner that a change demanded by a driver is reflected in overall engine output.

The invention is an engine throttle valve controller for a vehicle having an engine with a throttle valve. The controller includes a driver's demand torque calculation section to calculate a driver's demand torque that corresponds to a driver's request based on at least accelerator position. An engine demand torque calculation section calculates a first parameter representing a torque that the engine requires irrespective of the driver's accelerator request (for example, a torque required to maintain a minimum idle speed). A minimum air flow calculation section calculates a second parameter representing a minimum air flow into the engine. A selection section selects a greater one of the first parameter and the second parameter. A combination section combines the driver's demand torque with a torque corresponding to the parameter selected by the selection section to produce a target torque to control the throttle valve.

The second parameter can represent a minimum air flow into the engine for boost control. The first parameter and the second parameter can be, for example, torques or air flow rates. The minimum air flow calculation section can calculate the second parameter based at least in part on a variable target air-fuel ratio. The engine demand torque calculation section can calculate the first parameter such that engine idle speed is maintained during engine idle control.

BRIEF DESCRIPTION OF THE DRAWINGS

The invention will be described in further detail below with reference to the accompanying drawings, wherein:

FIG. 4 is a control block diagram showing a portion of throttle position control and details of the target torque calculation section for the first embodiment.

FIG. 10 is a control block diagram showing a second embodiment.

FIG. 11 is a control block diagram showing a third embodiment.

FIG. 12 is a control block diagram showing target torque calculation for a fourth embodiment.

DETAILED DESCRIPTION OF PREFERRED EMBODIMENTS

Figure 1:
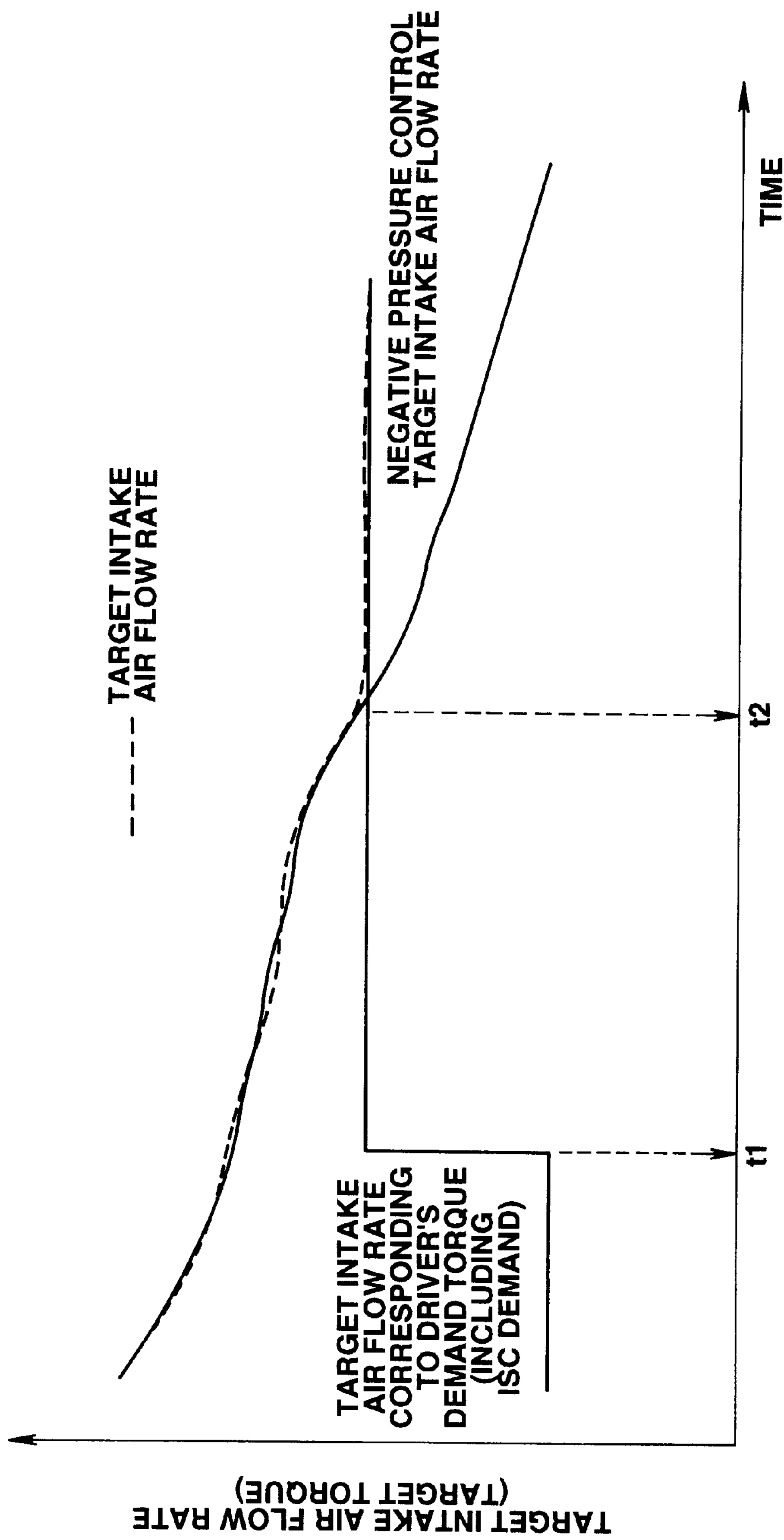
FIG. 1 is a diagram showing problems associated with one control technique.
Figure 2:
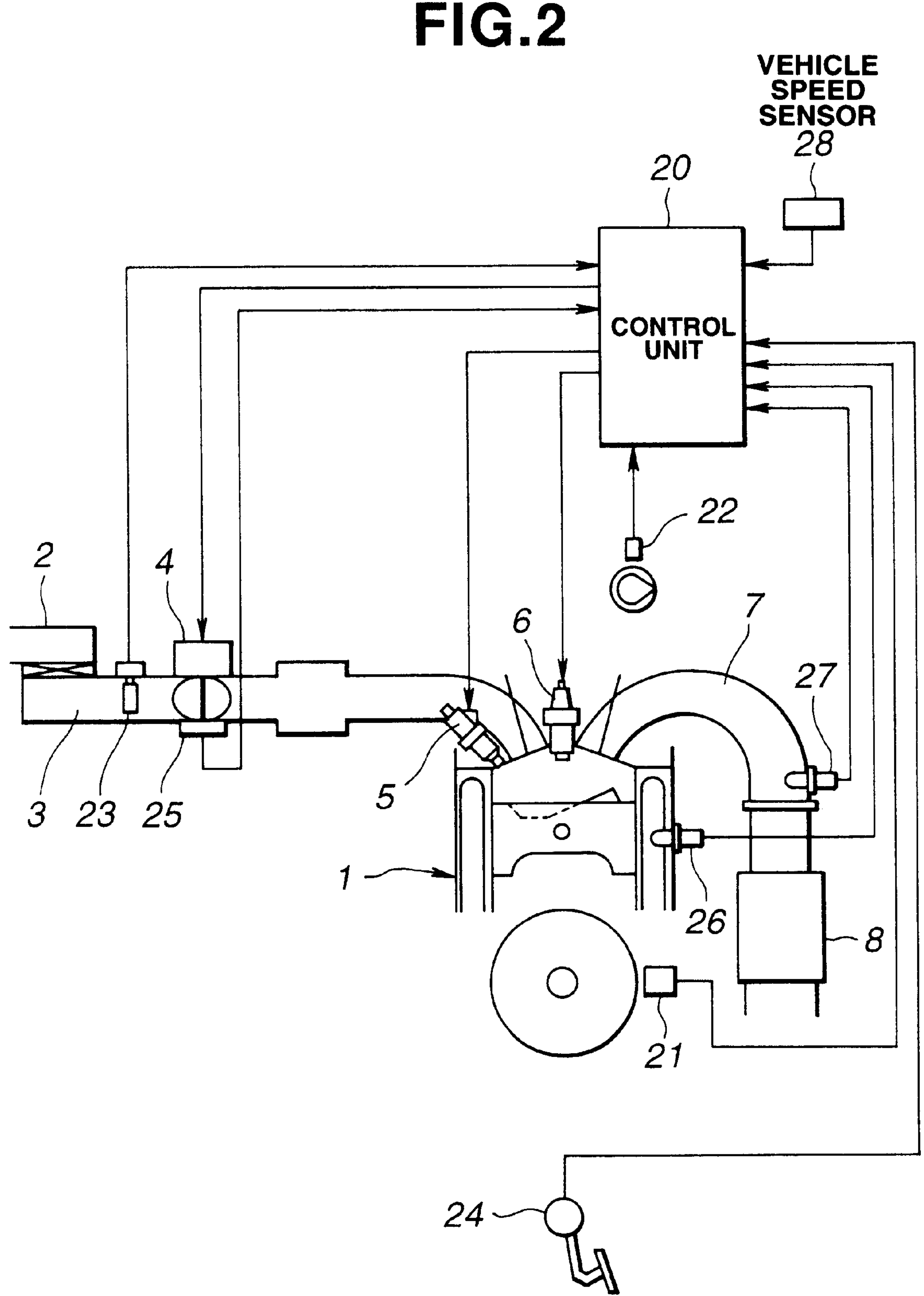
FIG. 2 is a system diagram showing one embodiment of the invention.

FIG. 2 is a system diagram showing a direct-injection spark-ignition engine 1 to which the invention is applicable.

Air is introduced through an air cleaner 2 into an intake passage 3. An electronic controlled throttle valve 4 controls the amount of air provided to the engine. The degree of opening of the electronic controlled throttle valve 4 (the throttle valve position) is controlled by, for example, a step motor operated in response to a signal from a control unit 20.

An electro-magnetic fuel injector 5 is provided for direct injection of fuel (gasoline) into the combustion chamber. The fuel injector 5 opens to inject fuel, adjusted to a predetermined pressure, when its solenoid receives a fuel injection pulse signal outputted from the control unit 20 during an intake or compression stroke in synchronism with engine rotation to inject fuel. When fuel is injected during the intake stroke, the injected fuel diffuses in the combustion chamber to form a homogeneous mixture. When the fuel is injected during the compression stroke, a stratified mixture is formed around a spark plug 6. The spark plug 6 produces a spark to ignite the mixture for combustion. The combustion modes can include homogeneous stoichiometric combustion (at an air-fuel ratio of about 14.7), homogeneous lean combustion (at air-fuel ratios ranging from about 20 to 30), and stratified lean combustion (at air-fuel ratios of about 40), in accordance with air-fuel ratio control (to be discussed below).

Exhaust gases are discharged from the engine 1 into an exhaust passage 7. The exhaust passage 7 has a catalytic converter 8 for purifying the exhaust gases.

The control unit, or controller, 20 includes a microcomputer or other processor comprised of a CPU, a ROM, a RAM, an A/D converter and an input/output interface and receives signals from various sensors. One suitable control unit is, for example, a Hitachi SH70 series processor, programmed in C and/or machine language.

These sensors include crankshaft and camshaft angle sensors 21 and 22 for detecting the rotation of the crankshaft and/or camshaft of the engine 1. The sensors 21 and 22 produce a reference pulse signal REF for each 720°/n of shaft rotation (where n is the number of cylinders) at a predetermined shaft position and also a unit pulse signal POS at a predetermined number of degrees (1 or 2) of rotation of the shaft. The engine speed Ne can be calculated based on the period of the reference pulse signal REF.

The sensors also include an airflow meter 23 provided in the intake passage 3 at a position upstream of the throttle valve 4 for detecting the intake air flow rate Qa (the amount of air permitted to enter the engine); an accelerator position sensor 24 for detecting the accelerator position ACC (the degree to which the accelerator is depressed); and a throttle valve sensor 25 (including an idle switch positioned to be turned on when the throttle valve 4 is fully closed to a predetermined position, which will be taken in response to the accelerator being fully released) for detecting the degree TVO of opening of the throttle valve 4. It should be noted that the throttle valve 4 will not be fully closed so that air may be introduced to the engine without providing an auxiliary air passage across the throttle valve 4. The throttle valve sensor 25 may be omitted as long as the accelerator position sensor 24 produces a replacement signal upon release of the accelerator pedal. The sensors further include a coolant temperature sensor 26 for detecting the temperature Tw of the coolant of the engine 1; an $O_2$ sensor 27 positioned in the exhaust passage 7 for producing a signal corresponding to the rich/lean condition of the exhaust gas (air-fuel ratio); and a vehicle speed sensor 28 for detecting the vehicle speed VSP.

Figure 3:
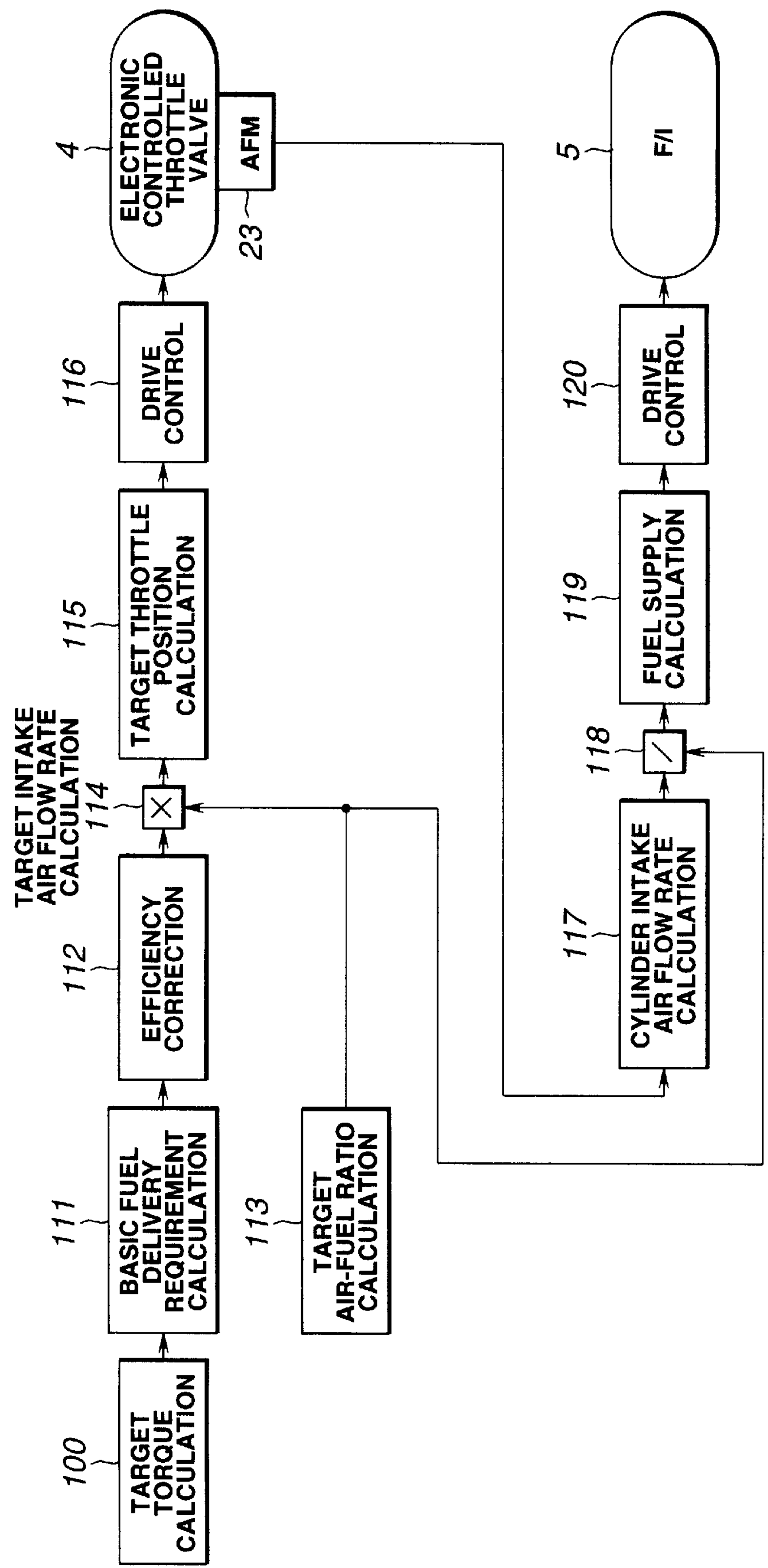
FIG. 3 is a control block diagram for overall torque demand control for a first embodiment.

The control unit 20 receives the signals fed thereto from the various sensors and, using a microcomputer built therein, makes the calculations for torque demand control, as shown in the control block diagrams of FIGS. 3 and 4, to control the degree of opening of the electronic controlled throttle valve 4 and the fuel injector 5 in a manner to control the amount of fuel injected into the engine.

FIG. 3 is a control block diagram showing overall torque demand control. FIG. 4 is a control block diagram showing a portion of throttle valve position control of the torque demand control and details of the target torque calculation section. The sections described herein are implemented in hardware, software, or a combination of both, in the control unit 20, in accordance with the descriptions set forth herein.

As shown in FIG. 4, this first embodiment includes a target torque calculation section 100. Target torque calculation section 100 includes a driver's demand torque calculation section 101, an ISC (idle speed control) target torque calculation section 103, a negative pressure control target intake (air) flow rate calculation section 105, a torque conversion section 106, a correction section 107, a selection section 108, and an addition section 109.

Figure 5:
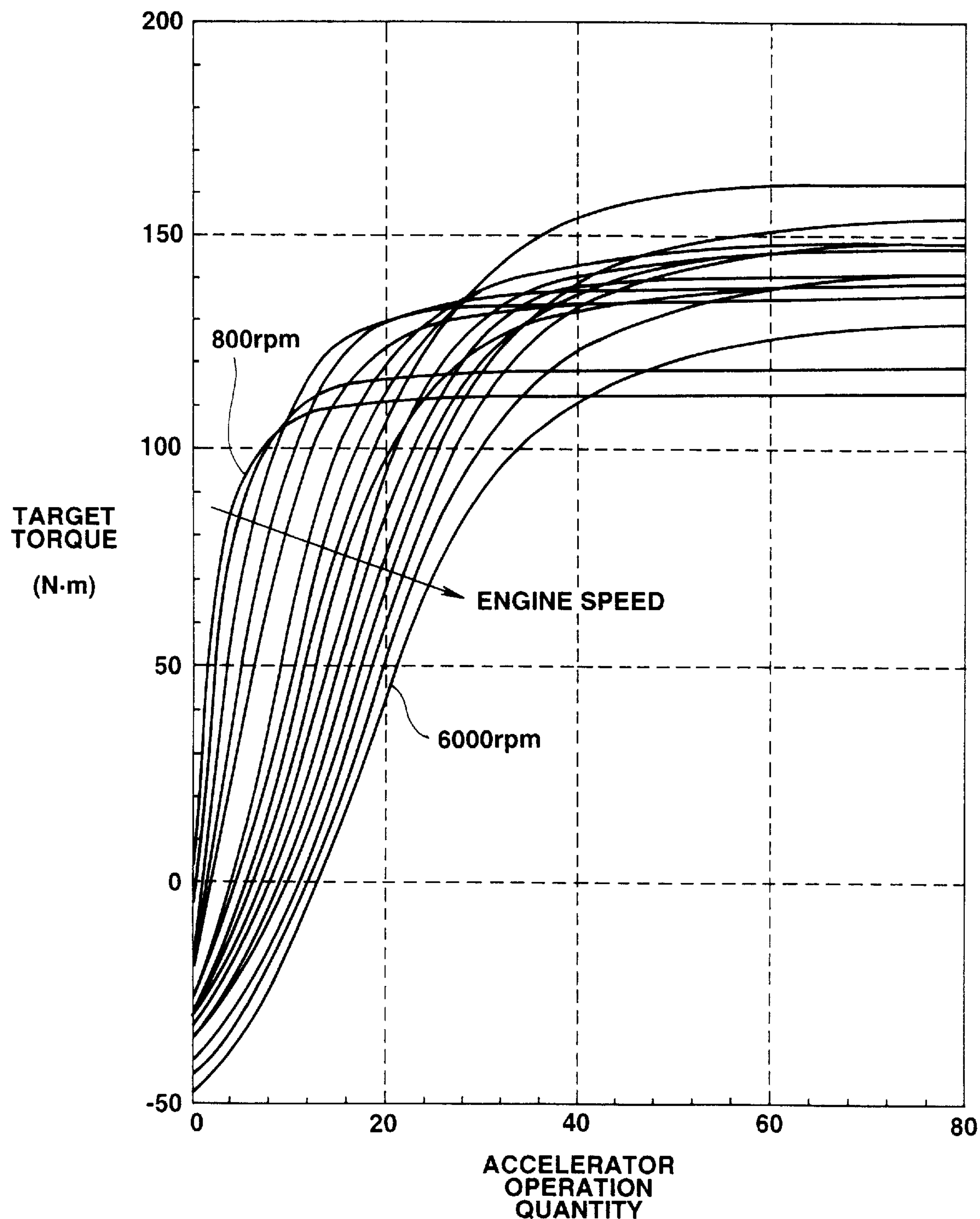
FIG. 5 illustrates characteristics for calculation of target torque.

Section 101 calculates a first target torque, which corresponds to the torque required by the driver, using a map such as the one shown in FIG. 5, which indicates how target torque varies in accordance with accelerator operation quantity (typically, accelerator depression) and measured engine speed.

Figure 6:
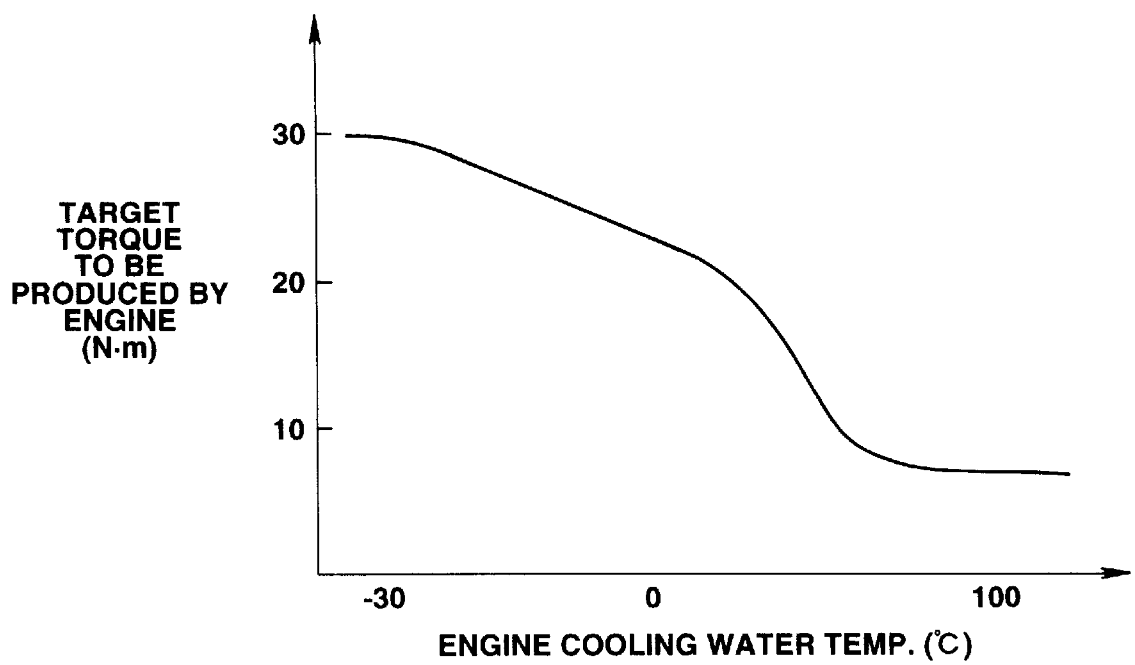
FIG. 6 illustrates characteristics for target torque during idle control.

Section 103 calculates a second target torque which corresponds to the torque required to control the engine speed to a predetermined value during idle control using a map, such as the one shown in FIG. 6, which indicates how target torque for idle control varies with engine cooling water temperature. Generally, as engine temperature increases, target torque for idle control can be reduced because the engine is operating in a more stable condition. The value obtained from a curve such as the one shown in FIG. 6 can be further modified by taking into account various other parameters, such as whether or not the air conditioner is in operation. For example, if the air conditioner is in operation, the target torque can be increased by, for example, 5 Nm. The value obtained from FIG. 6 can also be adjusted based on feedback from the engine, for example, based on a difference between actual engine speed and a target idle speed. Further details regarding idle speed control and refinements thereof are set forth in commonly-assigned U.S. patent application entitled "Engine Idle Speed Controller" filed under Ser. No. 09/084,115, based on Japanese patent applications P9-134585 and P9-134586. The entire contents of these applications are incorporated herein by reference.

Section 105 calculates the air flow rate necessary to ensure that the boost developed within the intake passage during deceleration is at a predetermined level (such as −600 mmHg). This minimizes oil leakage into the cylinder. In more detail, a target lower limit negative pressure (for example −600 mmHg) is set. A negative pressure control target intake air flow rate corresponding to the target lower limit negative pressure is calculated. This calculation can be made based on the following formula:

$$\text{cylinder volume} \times (760-600)/760$$

The calculation can be refined to take into account residual gases in the cylinder, such as internal EGR gas.

Torque conversion section 106 generates a torque based on the air flow rate from section 105 and an air-fuel ratio received from a target air-fuel ratio calculation section 113 (section 113 will be described below). In this embodiment, the torque is obtained by dividing the air flow rate by the air-fuel ratio and then multiplying the quotient by a coefficient K1.

The selection section 108 makes a comparison between the ISC target torque from section 103 and the negative pressure control target torque from section 106 (corresponding to the negative pressure control target intake air flow rate), selects the greater one, and outputs the selected torque.

The adding section 109 adds the torque from section 108 to the driver's demand torque from section 101 to calculate a target torque. These two torques can be combined in a manner other than straight addition.

After this target torque is calculated in the target torque calculation section 100 (shown in FIGS. 3 and 4), the processing proceeds to a basic fuel delivery requirement calculation section 111. In section 111, a required basic fuel quantity is calculated. This basic fuel quantity is proportional to the target torque generated by section 109, and is obtained by, for example, multiplying the target torque from section 109 by a coefficient K2.

Figure 7:
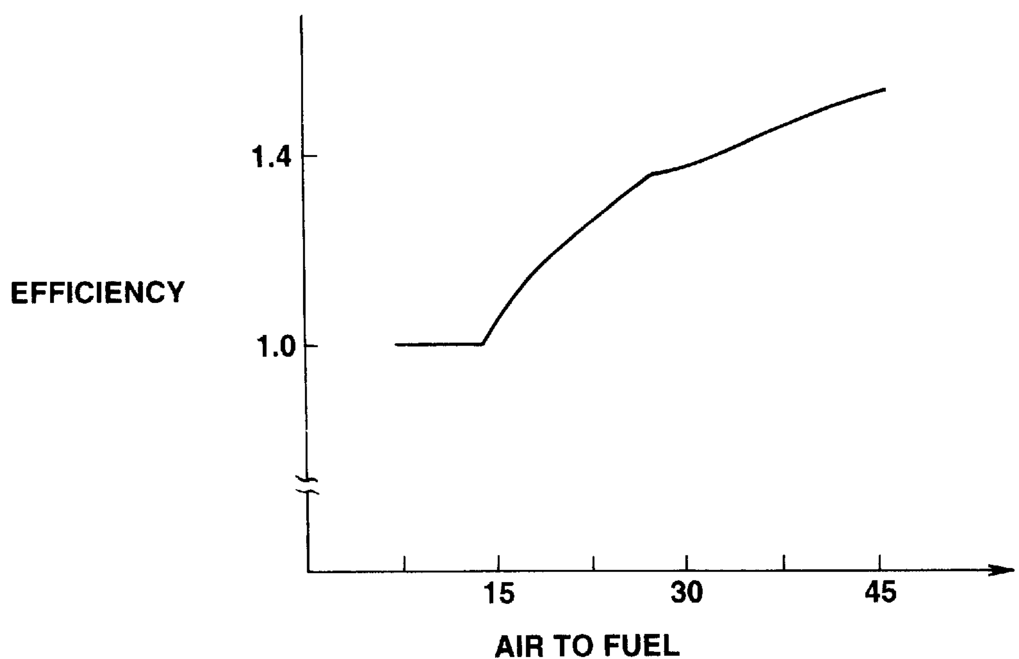
FIG. 7 illustrates characteristics for combustion efficiency.

Efficiency correction section 112 corrects for combustion efficiency, which varies when air-fuel ratio changes between homogeneous combustion (low air-fuel ratios) and stratified combustion (high air-fuel ratios). A map such as the one shown in FIG. 7 is used to obtain an efficiency corresponding to the air-fuel ratio. The output of section 111 is divided by the efficiency value obtained from FIG. 7.

Figure 8:
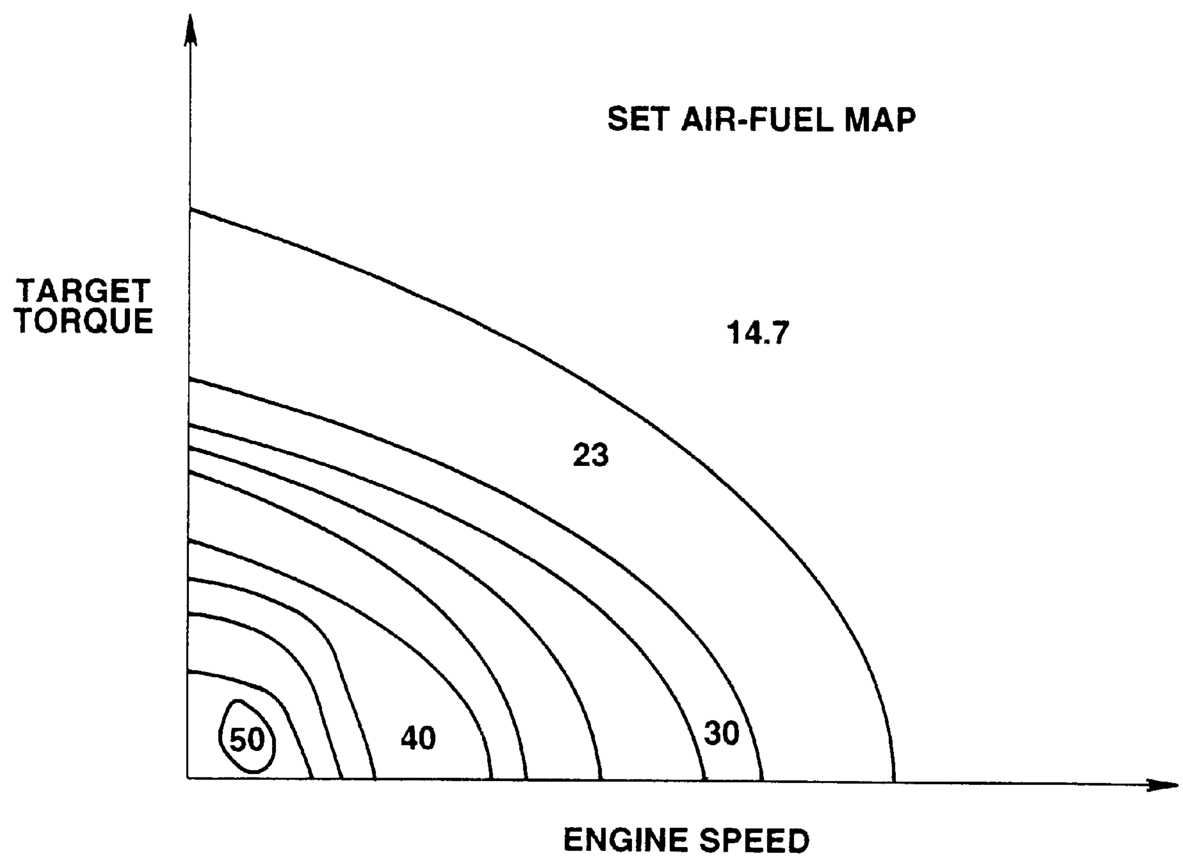
FIG. 8 illustrates characteristics of a set air-fuel ratio map.

Target air-fuel ratio calculation section 113 uses a map such as the one shown in FIG. 8 to set the target air-fuel ratio (tAFR) based on actual engine speed. Specifically, tAFR is obtained from FIG. 8 as corresponding to actual engine speed by presuming the magnitude of target torque to be substantially minimal. This is because the amount of torque during deceleration for the boost control may be minimal as long as a minimum air flow into the engine is maintained. Additional discussion regarding how target air-fuel ratio can be adjusted for various engine operating conditions is set forth in U.S. patent application No. 08/901,963, filed Jul. 29, 1997, now U.S. Pat. No. 5,832,895, and entitled "Control System for Internal Combustion Engine."

A target intake air flow rate calculation section 114 includes a multiplier which multiplies the corrected basic fuel delivery requirement from section 112 by the target air-fuel ratio from section 113 to calculate a target intake air flow rate per cylinder (tQcyl).

Figure 9:
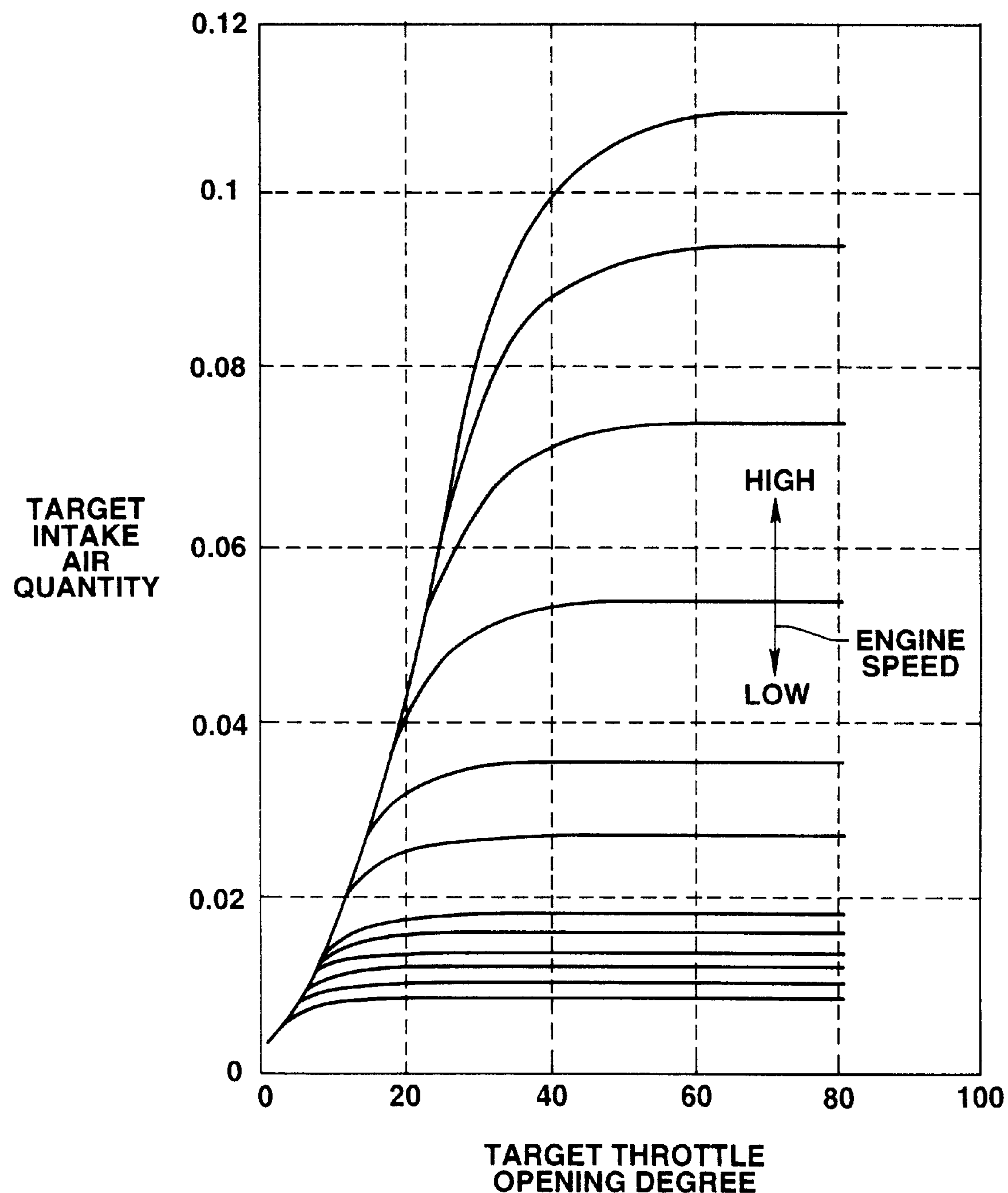
FIG. 9 illustrates characteristics for calculating the target throttle opening degree from the target intake air quantity.

A target throttle position calculation section 115 calculates a target throttle opening by first obtaining the target intake air quantity (flow) for all of the cylinders by multiplying the target intake air flow rate per cylinder (from section 114) by engine speed and a coefficient K3. Then, using a map such as the one shown in FIG. 9, the target throttle opening degree is determined, based on the target intake air quantity and engine speed.

A throttle valve drive control section 116 drives a DC motor (or a step motor in a stepped manner) in response to a command signal corresponding to the target throttle opening degree so as to bring the throttle valve 4 to the target throttle opening degree. The airflow meter 23 detects the actual intake air flow rate (Qa), controlled by the throttle valve 4.

As shown in FIG. 3, cylinder intake air flow rate calculation section 117 calculates a cylinder intake air flow rate (Qcyl) by dividing the actual intake air flow rate Qa by the engine speed Ne, or by smoothing the actual intake air flow rate.

A target fuel supply calculation section 118 includes a divider for dividing the cylinder intake air flow rate (Qcyl) by the target air-fuel ratio (tAFR) to calculate a target fuel supply (tQfi). A fuel supply calculation section 119 makes various corrections to the target fuel supply (tQfi).

A fuel injector drive control section 120 produces a drive pulse signal having a pulse width corresponding to the corrected target fuel supply to drive the fuel injector 5 such that fuel injector 5 is controlled to realize the corrected target fuel supply.

FIGS. 10 and 11 show second and third embodiments. The FIG. 10 embodiment is similar to the FIG. 4 embodiment except that in the FIG. 10 embodiment, the negative pressure control target intake flow rate is not corrected using the target air-fuel ratio. Also, FIG. 10 illustrates that the target torque calculation is separated into a driver's demand torque calculation (performed by section 101) and engine demand torque calculation (performed by an engine demand torque calculation section 102). The other embodiments can also be divided into driver demand and engine demand sections.

The FIG. 11 embodiment is similar to the FIG. 4 embodiment except that in the FIG. 11 embodiment, correction for the target air-fuel ratio during the negative pressure control calculations is performed in a correction section 107' after conversion of the negative pressure control target intake air flow rate to a torque value. This is done by dividing the torque from section 106 by the target air-fuel ratio from section 113.

Such corrections for target air-fuel ratio permit application of the invention to engines such as direct-injection spark-ignition type engines and the like wherein the air-fuel ratio changes over great range, by making a correction based on the target air-fuel ratio upon, for example, torque conversion of the negative pressure control target intake air flow rate.

Figure 13:
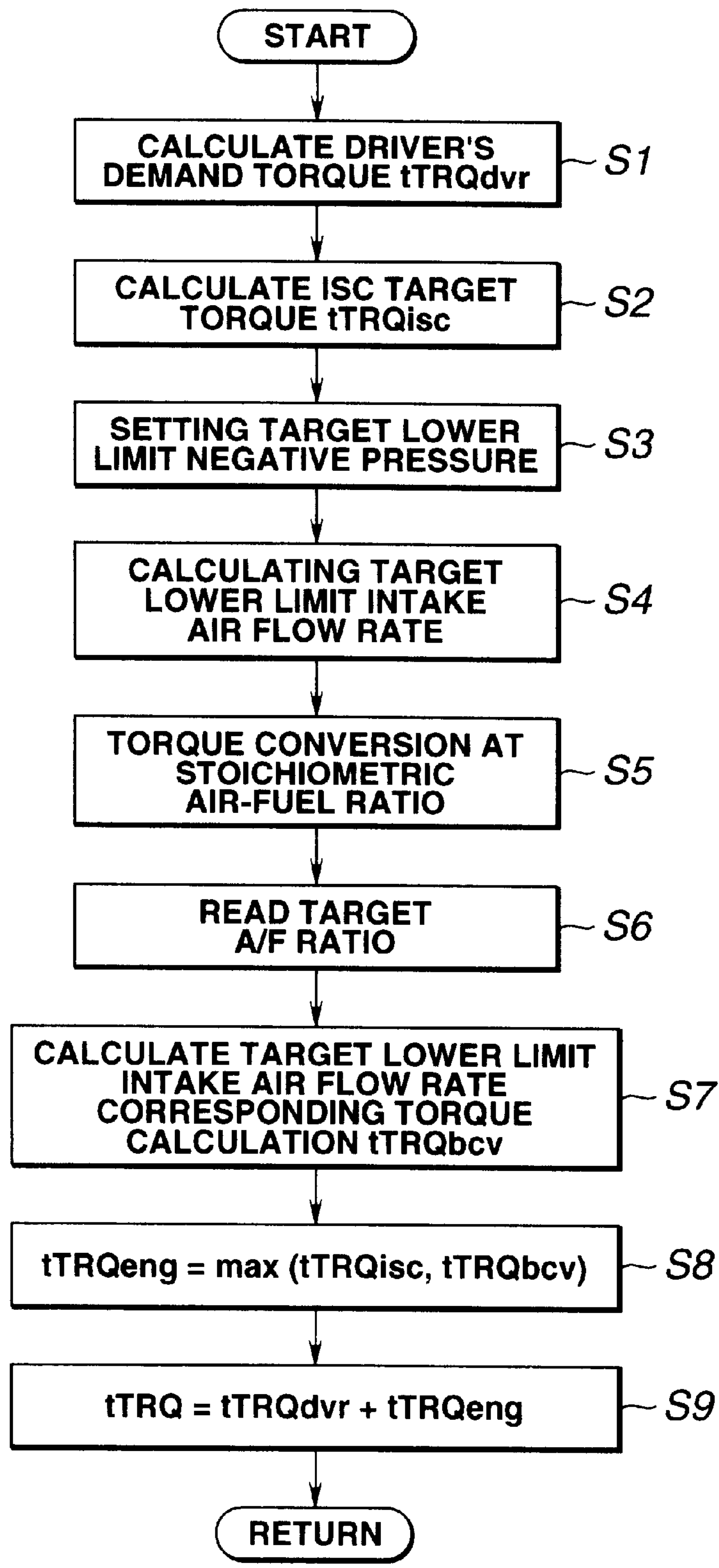
FIG. 13 is a flow diagram showing the target torque calculation of FIG. 12 in greater detail.

FIGS. 12 and 13 will be used to describe a fourth embodiment of the invention. This embodiment is similar to the FIG. 11 embodiment.

In step S1, a driver demand torque (tTRQdvr) is calculated from a predetermined map based on accelerator position ACC and engine speed Ne, as discussed above.

In step S2, torque increase/decrease control calculation is performed for engine idling by a comparison between the actual idling speed and a target idling speed to calculate an ISC target torque tTRQisc.

In step S3, a target lower limit negative pressure is set (for example, −600 mmHg) for negative pressure control during deceleration.

In step S4, a negative pressure control target intake air flow rate (a target lower limit intake air flow rate) corresponding to the target lower limit negative pressure is calculated. This calculation can be made simply using the formula:

$$\text{cylinder volume} \times (760-600)/760.$$

The calculation can also take into account the amount of residual gases such as interior EGR gas.

In step S5, a stoichiometric torque conversion is performed. That is, the torque (stoichiometric target torque) produced at the target lower limit intake air flow rate when fuel is injected at the stoichiometric air-fuel ratio of 14.7 is calculated. In practice, such torque can be obtained experimentally and approximated by a linear equation.

In step S6, the target air-fuel ratio is read.

In step S7, a correction is made based on the target air-fuel ratio (tAFR). That is, the negative pressure control target torque (the torque corresponding to the target lower limit intake air flow rate) tTRQbcv is calculated as the stoichiometric target torque×14.7/tAFR.

In step S8, the greater one of the ISC target torque tTRQisc and the negative pressure control target torque (the torque corresponding to the target lower limit intake air flow rate) tTRQbcv is selected as an engine demand torque tTRQeng=max (tTRQisc, tTRQbcv).

In step S9, the engine demand torque tTRQeng is added to the driver demand torque tTRQdvr to calculate the final target torque tTRQ=tTRQdvr+tTRQeng.

Figure 14:
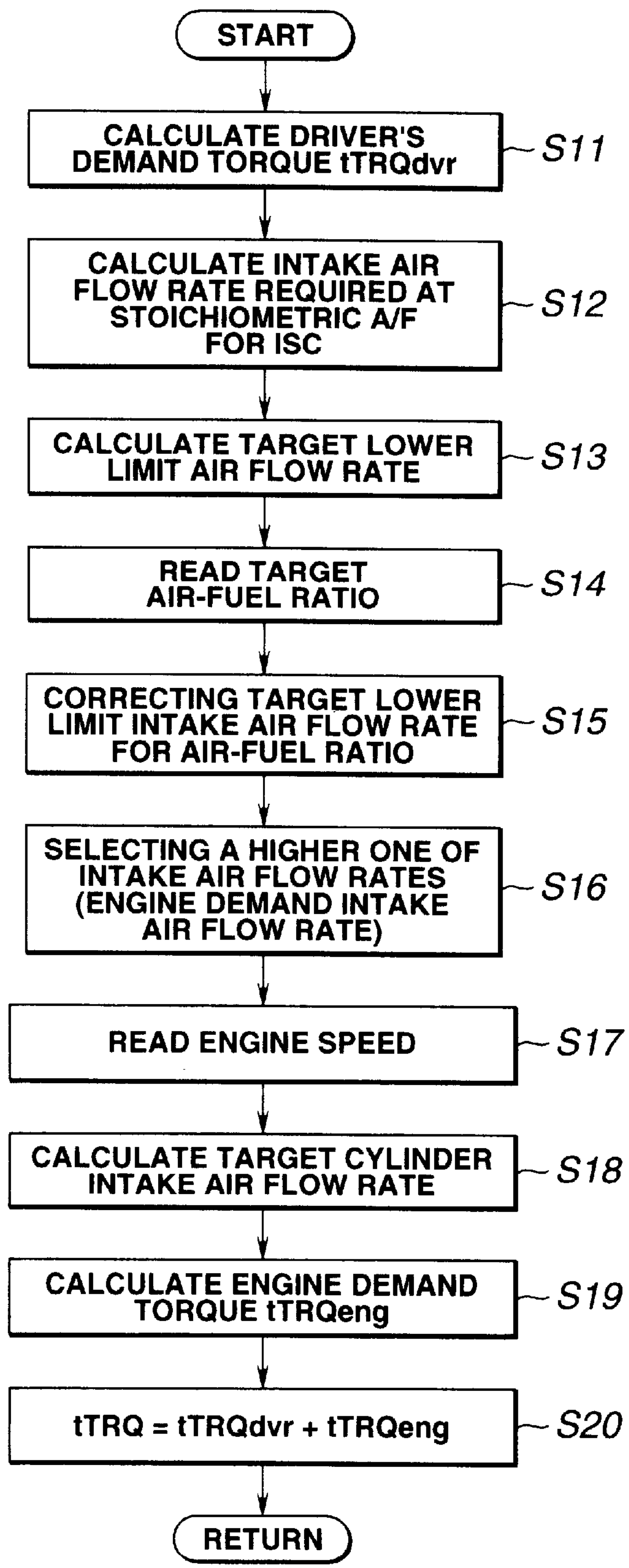
FIG. 14 is a flow diagram for a fifth embodiment.

FIG. 14 is a flow diagram showing an alternative manner of target torque calculation according to a fifth embodiment.

In step S11, the driver's demand torque tTRQdvr is calculated from a predetermined map based on accelerator position ACC and engine speed Ne.

In step S12, the ISC intake air flow rate required at the stoichiometric air-fuel ratio is calculated for increase/decrease control using a comparison between the actual idling speed and the target idling speed.

In step S13, the negative pressure control target intake air flow rate (the target lower limit intake air flow rate) corresponding to the target lower limit negative pressure for deceleration negative pressure control is calculated.

In step S14, the target air-fuel ratio tAFR is read.

In step S15, a correction is made based on the target air-fuel ratio tAFR. That is, the target lower limit intake air flow rate is corrected in accordance with the air-fuel ratio as follows:

target lower limit intake air flow rate×14.7/tAFR.

In step S16, a greater one of the ISC intake air flow rate required at the stoichiometric air-fuel ratio and the negative pressure control target intake air flow rate from step S15 (the target lower limit intake air flow rate) is selected. The selected air flow rate is set as an engine demand intake air flow rate.

In step S17, the engine speed Ne is read.

In step S18, the target cylinder intake air flow rate is calculated based on the engine demand intake air flow rate and the engine speed.

In step S19, the target cylinder intake air flow rate is converted to an engine demand torque tTRQeng.

In step S20, the engine demand torque tTRQeng is added to the driver's demand torque tTRQdvr to calculate the final target torque tTRQ=tTRQdvr+tTRQeng.

Thus, according to the invention, a target torque is produced in a manner so as to provide a torque increase corresponding to a torque increase demanded by the driver by combining the driver demand torque and the engine demand torque to calculate the target torque. This is effective to provide a response to the driver's demand while taking engine demand into account, so as to improve driving performance.

The engine demand torque can be set at an appropriate value by selecting a greater one of the idling speed control target torque and the negative pressure control target torque, and setting the selected one as the engine demand torque.

Also, correction for negative pressure control is made based on the target air-fuel ratio. This allows the invention to be applicable to engines such as direct injection spark-ignition type engines or the like wherein air-fuel ratio changes over a great range.

The entire contents of Japanese patent application No. Tokugan Hei 9-167316 (filed Jun. 24, 1997) and Press Information entitled "Nissan Direct-Injection Engine" (Document E1-2200-9709 of Nissan Motor Co., Ltd., Tokyo, Japan) are incorporated herein by reference.

Although the invention has been described above by reference to certain embodiments of the invention, the invention is not limited to the embodiments described above. Modifications and variations of the embodiments described above will occur to those skilled in the art, in light of the above teachings. For example, the characteristic curves shown in the Figures are merely examples and other curves can be employed. Engine air intake need not be controlled by a single valve. The scope of the invention is defined with reference to the following claims.

What is claimed is:

1. An engine throttle controller for a vehicle having an engine, the controller comprising:

- a driver's demand torque calculation section to calculate a driver's demand torque that corresponds to a driver's request based on at least accelerator position;
- an engine demand torque calculation section to calculate a first parameter representing a torque that the engine requires irrespective of a driver's accelerator request;
- a minimum air flow calculation section to calculate a second parameter representing a minimum air flow into the engine;
- a selection section to select a greater one of the first parameter and the second parameter; and
- a combination section to combine the driver's demand torque with a torque corresponding to the parameter selected by the selection section to produce a target torque to control engine air intake.

2. A controller as set forth in claim 1, wherein the second parameter represents a minimum air flow into the engine for boost control.

3. A controller as set forth in claim 1, wherein the controller controls an electronically controlled throttle valve.

4. A controller as set forth in claim 1, wherein the first parameter and the second parameter are torques.

5. A controller as set forth in claim 1, wherein the first parameter and the second parameter are air flow rates.

6. A controller as set forth in claim 1, wherein the combination section adds the driver's demand torque to a torque corresponding to the parameter selected by the selection section to produce said target torque.

7. A controller as set forth in claim 1, wherein the minimum air flow calculation section calculates the second parameter based at least in part on a variable target air-fuel ratio.

8. A controller as set forth in claim 1, wherein the engine demand torque calculation section calculates the first parameter such that engine idle speed is maintained during engine idle control.

9. A controller as set forth in claim 2, wherein the minimum air flow calculation section calculates the second parameter based at least in part on a variable target air-fuel ratio.

10. A controller as set forth in claim 9, wherein the engine demand torque calculation section calculates the first parameter such that engine idle speed is maintained during engine idle control.

* * * * *